US008718960B2

(12) United States Patent
Suk et al.

(10) Patent No.: US 8,718,960 B2
(45) Date of Patent: May 6, 2014

(54) SYSTEM AND METHOD OF SELECTING WHITE GAUSSIAN NOISE SUB-BAND USING SINGULAR VALUE DECOMPOSITION

(75) Inventors: Mi-Kyung Suk, Daegu (KR); Sang Tae Kim, Daejeon (KR); Gwangmoon Park, Daejeon (KR); Seong Yun Lee, Daejeon (KR); Haeng Sook Ro, Daejeon (KR); Heung Yong Kang, Daejeon (KR); Yong-Seok Choi, Daejeon (KR); Young Soo Kim, Yongin-si (KR); Seung Min Shin, Yongin-si (KR)

(73) Assignees: Electronics and Telecommunications Research Institute, Daejeon (KR); University-Industry Cooperation Group of Kyung Hee University, Yongin (KR)

( * ) Notice: Subject to any disclaimer, the term of this patent is extended or adjusted under 35 U.S.C. 154(b) by 844 days.

(21) Appl. No.: 12/750,132

(22) Filed: Mar. 30, 2010

(65) Prior Publication Data

US 2011/0077886 A1  Mar. 31, 2011

(30) Foreign Application Priority Data

Sep. 30, 2009  (KR) .................. 10-2009-0093135

(51) Int. Cl.
*G01R 23/16* (2006.01)
*H04B 17/00* (2006.01)

(52) U.S. Cl.
CPC ................................ *H04B 17/0055* (2013.01)
USPC .......................................................... 702/76

(58) Field of Classification Search
CPC .................................................. H04B 17/0055
USPC .......................................................... 702/76
See application file for complete search history.

(56) References Cited

U.S. PATENT DOCUMENTS 5,802,446 A * 9/1998 Giorgi et al. .................... 455/69
6,570,913 B1 * 5/2003 Chen ............................. 375/223
(Continued)

FOREIGN PATENT DOCUMENTS

| JP | 3263009 | 12/2001 |
| KR | 2003-0070177 | 8/2003 |
| KR | 10-0473679 | 2/2005 |

OTHER PUBLICATIONS

Klema et al., The Singular Value Decomposition: Its Computation and Some Applications, IEEE Transactions on Automatic Control, vol. AC-25, No. 2, Apr. 1980.*

(Continued)

*Primary Examiner* — John Breene
*Assistant Examiner* — Timothy H Hwang
(74) *Attorney, Agent, or Firm* — Staas & Halsey LLP (57) ABSTRACT

Provided is a method of selecting a white Gaussian noise sub-band using singular value decomposition (SVD). The method includes selecting a first frequency band, verifying whether a signal is included in the selected first frequency band, determining the first frequency band as a target measurement frequency when the signal is not included in the selected first frequency band, and measuring a background radio noise in the determined target measurement frequency.

9 Claims, 6 Drawing Sheets

(56) References Cited

U.S. PATENT DOCUMENTS

| | | |
|---|---|---|
| 6,947,373 B2 | 9/2005 | Siala et al. |
| 6,952,563 B2 * | 10/2005 | Brown et al. ............... 455/67.11 |
| 2005/0281221 A1 * | 12/2005 | Roh et al. ...................... 370/328 |
| 2007/0237210 A1 * | 10/2007 | Voglewede et al. ........... 375/136 |
| 2008/0125071 A1 * | 5/2008 | Maeda et al. .................. 455/313 |
| 2010/0002816 A1 * | 1/2010 | Mody et al. ................... 375/350 |

OTHER PUBLICATIONS

Seung-min Shin, et al., "An Effective Selection of White Gaussian Noise Sub-band Using Singular Value Decomposition," Korea Information and Communications Society, vol. 34, No. 3, Mar. 31, 2009, pp. 272-273.

* cited by examiner

SYSTEM AND METHOD OF SELECTING WHITE GAUSSIAN NOISE SUB-BAND USING SINGULAR VALUE DECOMPOSITION

CROSS-REFERENCE TO RELATED APPLICATION

This application claims the benefit of Korean Patent Application No. 10-2009-0093135, filed on Sep. 30, 2009, in the Korean Intellectual Property Office, the disclosure of which is incorporated herein by reference.

BACKGROUND

1. Field

Exemplary embodiments relate to a method of selecting a white Gaussian noise sub-band using singular value decomposition (SVD).

2. Description of the Related Art

A concept for a process of finding a frequency or a frequency band each being comprised of noise without signals in a preceding process prior to a method of measuring background radio noise has been already introduced and attempted. The above process of finding the frequency or the frequency band may be a process of simply obtaining a minimum value from results measured from a spectrum, or a process of transforming data of a frequency domain into data of a time domain to thereby obtain a spectrum data value, and thereby may select a frequency or a frequency band each being suitable for measuring noise.

In this case, it may be difficult to effectively determine presence/absence of signals, resulting in occurrence of errors in results measured from a noise level. A more improved amplitude probability distribution (APD) method may determine presence/absence of Gaussian noise only based on a resultant graph obtained when a horizontal axis is disposed by a Rayleigh size based on characteristics of the Gaussian noise. In this instance, as for time domain measurement data, a ratio exceeding a vertical axis-level may be expressed in the horizontal axis using a predetermined equation.

However, since the APD method may greatly rely on an intuition of a user, there is a need for a more objective and analytical mathematical tool to solve this problem.

SUMMARY

An aspect of exemplary embodiments provides a method of selecting a white Gaussian noise sub-band using singular value decomposition (SVD), which may determine presence/absence of signals to select a frequency or a frequency band being comprised of only noise without the signals, and may measure background radio noise in the selected frequency or frequency band, thereby improving accuracy and reliability of the measured result.

Another aspect of exemplary embodiments provides a method of selecting a white Gaussian noise sub-band using SVD, which may adopt SVD of a mathematical tool, thereby effectively locating a frequency or a frequency band being comprised of only background radio noise.

According to an aspect of exemplary embodiments, there is provided a method of selecting a white Gaussian noise sub-band using SVD, the method including: electing a first frequency band; verifying whether a signal is included in the selected first frequency band; determining the first frequency band as a target measurement frequency when the signal is not included in the selected first frequency band; and measuring a background radio noise in the determined target measurement frequency.

According to another aspect of exemplary embodiments, there is provided a system of selecting a white Gaussian noise sub-band using SVD, the system including: a frequency selection unit to select a first frequency band; a signal verification unit to verify whether a signal is included in the selected first frequency band; a target frequency determination unit to determine the first frequency band as a target measurement frequency when the signal is not included in the selected first frequency band; and a noise measurement unit to measure a background radio noise in the determined target measurement frequency.

Additional aspects, features, and/or advantages of embodiments will be set forth in part in the description which follows and, in part, will be apparent from the description, or may be learned by practice of the disclosure.

Effect

According to exemplary embodiments, it is possible to effectively select a frequency or a frequency band being suitable for measuring noise by preventing errors from occurring when intuitively determining a linear pattern of an amplitude probability distribution (APD) is performed, and when measuring a simple noise level.

Also, according to exemplary embodiments, it is possible to more objectively and effectively select a frequency or a frequency band being comprised of only background radio noise by adopting singular value decomposition (SVD), thereby computing a more reliable and accurate noise level.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Figure 1:
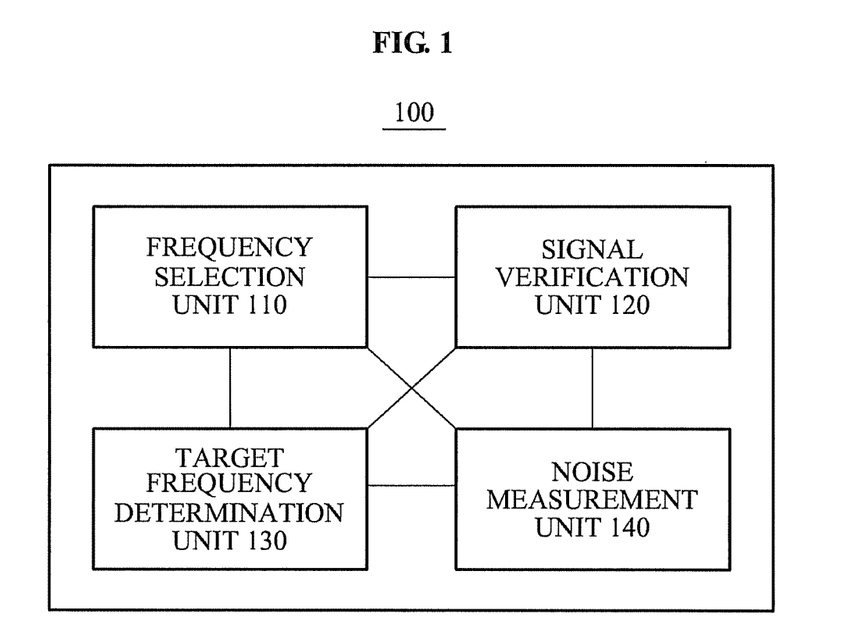
FIG. 1 is a diagram illustrating a configuration of a system of selecting a white Gaussian noise sub-band using singular value decomposition (SVD) according to exemplary embodiments.

FIG. 1 is a diagram illustrating a configuration of a system 100 of selecting a white Gaussian noise sub-band using singular value decomposition (SVD) according to exemplary embodiments.

The system 100 includes a frequency selection unit 110, a signal verification unit 120, a target frequency determination unit 130, and a noise measurement unit 140.

The frequency selection unit 110 may select a first frequency band.

For example, the frequency selection unit 110 may measure, using a spectrum analyzer, a spectrum data value with respect to signals within each frequency band, and select, as the first frequency band, a frequency band having a minimum spectrum data value.

The signal verification unit 120 may verify whether signals excluding background radio noise (hereinafter, referred to as 'signal') are included in the selected first frequency band.

The signal verification unit 120 may adopt SVD to verify where the signal is included in the first frequency band.

For example, the signal verification unit 120 may acquire time domain data in association with the first frequency band, and configure an autocorrelation matrix using the acquired time domain data.

Also, the signal verification unit 120 may calculate a singular value $\sigma_k$ through SVD using the autocorrelation matrix, and compute a parameter v(k) using the singular value $\sigma_k$.

Here, the parameter v(k) may be computed by $$v(k) = \frac{\|A^{(k)}\|_F}{\|A\|_F} = \left[ \frac{\sum_{i=1}^{k} \sigma_i^2}{\sum_{i=1}^{h} \sigma_i^2} \right]^{\frac{1}{2}}. \quad \text{[Equation 1]}$$

In Equation 1, when a rank of 'A' of Equation 1 is smaller than a full rank 'h', a speed in which the parameter v(k) approaches '1' may increase, and when the rank of 'A' approximates to the full rank 'h', the speed may decrease.

Accordingly, the signal verification unit 120 may verify whether the signal is included in the first frequency band based on the parameter v(k).

The target frequency determination unit 130 may determine the first frequency band as a target measurement frequency when the signal is not included in the first frequency band.

The frequency selection unit 110 may select a second frequency band being different from the first frequency band when the signal is included in the first frequency band.

That is, when the signal is included in the first frequency band, the frequency selection unit 110 may measure, using the spectrum analyzer, a spectrum data value with respect to signal within each of remaining frequency bands excluding the first frequency band, and select, as the second frequency band to replace the first frequency band, the frequency band having the minimum spectrum data value.

The signal verification unit 120 may verify whether the signal is included in the second frequency band based on the parameter v(k). The target frequency determination unit 130 may determine the second frequency band as the target measurement frequency when the signal is not included in the second frequency band.

Even when the signal is included in the second frequency band, the system 100 may repeatedly perform the above described processes to find a frequency band where the signal is not included from each frequency band excluding the first and second frequency bands, and determine the found frequency band as the target measurement frequency.

The noise measurement unit 140 may measure background radio noise in the determined target measurement frequency band.

Accordingly, according to exemplary embodiments, it is possible to effectively select a frequency or a frequency band being suitable for noise measurement by preventing errors occurring when determining presence/absence of signals at the time of measurement of noise level, or by preventing errors occurring when an intuitive determination of a linear pattern of an amplitude probability distribution (APD) is performed.

Also, according to exemplary embodiments, it is possible to more objectively and effectively select a frequency or a frequency band being comprised of only background radio noise by adopting SVD, thereby computing a more reliable and accurate noise level.

Figure 2:
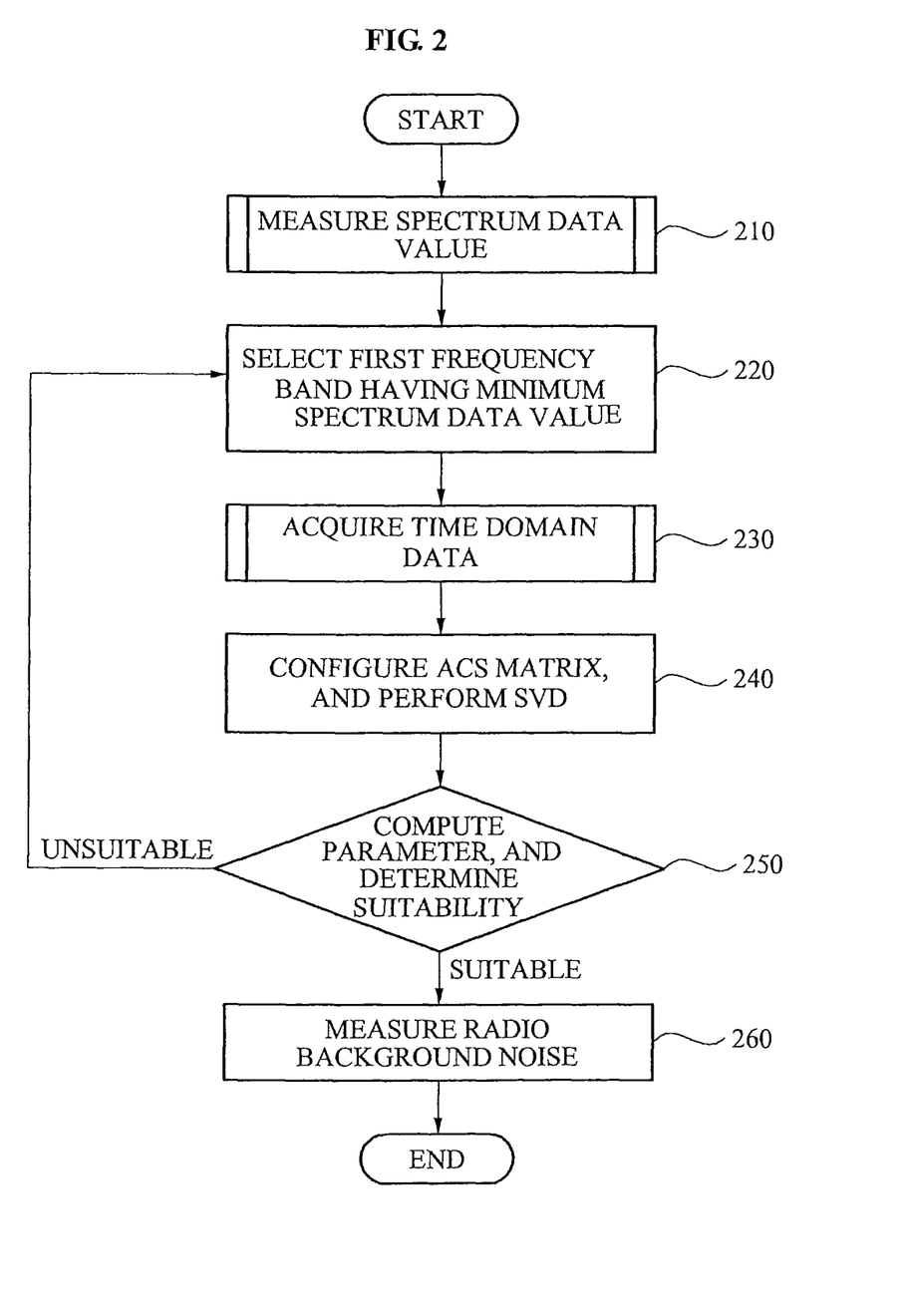
FIG. 2 is a flowchart illustrating a method of selecting a white Gaussian noise sub-band using SVD according to exemplary embodiments.

FIG. 2 is a flowchart illustrating a method of selecting a white Gaussian noise sub-band using an SVD according to exemplary embodiments.

The method may be implemented by the system 100 of FIG. 1. Descriptions of FIG. 2 will be made with reference to FIG. 1.

In operation S210, the system 100 may measure, using a spectrum analyzer, a spectrum data value with respect to signals excluding background radio noise (hereinafter, referred to as 'signal').

In operation S220, the system 100 may select, as a first frequency band, a frequency band having a minimum spectrum data value.

In operation S230, the system 100 may acquire time domain data in association with the first frequency band.

In operation S240, the system 100 may configure an autocorrelation matrix using the acquired time domain data, and calculate a singular value $\sigma_k$ through SVD using the autocorrelation matrix.

In operation S250, the system 100 may compute a parameter v(k) using the singular value $\sigma_k$, and determine a suitability by verifying whether the signal is included in the first frequency band based on the parameter v(k).

When the first frequency band is determined as a frequency band suitable for measuring the background radio noise based on the result of operation S250, the system 100 may determine the first frequency band as a target measurement frequency, and measure the background radio noise in the determined target measurement frequency band.

When the first frequency band is determined as a frequency band unsuitable for measuring the background radio noise based on the result of operation S250, the system 100 may advance operation S220 to select, as the second frequency band to replace the first frequency band, the frequency band having the minimum spectrum data value.

Next, when the second frequency band is determined as the frequency band suitable for measuring the background radio noise, the system 100 may determine the second frequency band as the target measurement frequency, and measure the background radio noise in the determined second frequency band.

Figure 3:
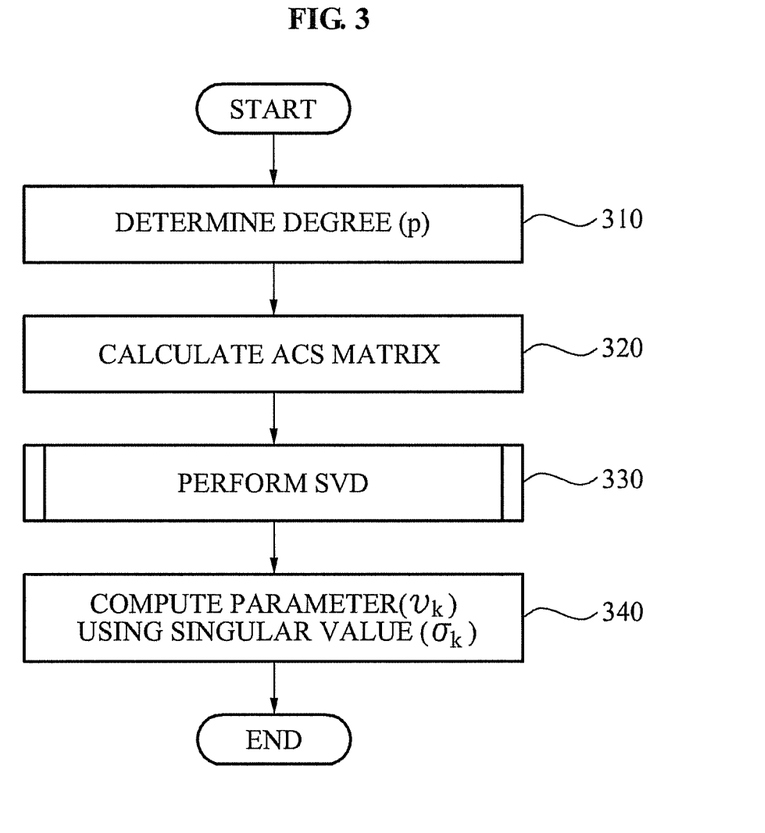
FIG. 3 is a flowchart illustrating a process of computing a parameter v(k) in a method of selecting a white Gaussian noise sub-band using SVD according to exemplary embodiments.

FIG. 3 is a flowchart illustrating a process of computing a parameter v(k) in a method of selecting a white Gaussian noise sub-band using an SVD according to exemplary embodiments.

The method may be implemented by the system 100 of FIG. 1.

In operation 310, the system 100 may determine an order 'p'.

A process of calculating an autocorrelation matrix in operation 320 after the order 'p' is determined in operation 310 will be herein described in detail.

The autocorrelation matrix of signals being comprised of M numbered complex sine waves may be represented as $$r_{xx}(k) = \sum_{i=1}^{M} P_i e^{j2\pi f_i kT} + \sigma^2 \delta(k), \quad \text{[Equation 2]}$$

where $P_\chi$ and $f_\chi$ respectively denote a power and a frequency of an i-th signal, and $\sigma^2$ denotes an average power of a white Gaussian noise.

A p-th order Toeplitz autocorrelation matrix '$R_\chi$' having a size of $(p+1)\times(p+1)$ may be represented as $$R_x = \begin{bmatrix} r_{xx}(0) & r_{xx}^*(1) & \ldots & r_{xx}^*(p) \\ r_{xx}(1) & r_{xx}(0) & \ldots & r_{xx}^*(p-1) \\ \vdots & \vdots & \vdots & \vdots \\ \vdots & \vdots & \ddots & \vdots \\ r_{xx}(p) & r_{xx}(p-1) & \ldots & r_{xx}(0) \end{bmatrix}. \quad \text{[Equation 3]}$$

In a case of the multi-sine wave mixed in the white noise, $R_\chi$ may be represented as a sum of a signal autocorrelation matrix '$S_\chi$' and a noise autocorrelation matrix '$W_\chi$', which is expressed as $$R_x = S_x + W_x = \sum_{i=1}^{M} P_i s_i s_i^H + \sigma^2 I, \quad \text{[Equation 4]}$$

where $S_\chi$, $W_\chi$, and a unit matrix 'I' have a size of $(p+1)\times(p+1)$, and $s_i$ indicates a signal vector with respect to M numbered signals, as a $(p+1)$-th order column vector.

$$s_i = [1 \exp(j2\pi f_i T) \ldots \exp(j2\pi f_i pT)]', \quad \text{[Equation 5]}$$

where [ ]' represents a transpose operator.

When the order 'p' of the autocorrelation matrix is greater than M, the signal autocorrelation matrix '$S_\chi$' may have a rank M. This is because $s_i$ is an orthogonal vector, and an outer product '$s_i s_i^H$' is a matrix having a rank '1'. The noise autocorrelation matrix '$W_\chi$' may have $(p+1)$ of a full rank.

In Equation 4, the signal autocorrelation matrix $S_\chi$ may be Hermitian and a positive semidefinite matrix, and eigenvalue-eigenvector decomposition may be performed on the signal autocorrelation matrix $S_\chi$.

$$S_\chi v_i = \lambda_i v_i, i=1,2,\ldots,p+1. \quad \text{[Equation 6]}$$

In this instance, when the signal autocorrelation matrix $S_\chi$ is re-expressed as a matrix, the following Equation 7 may be obtained.

$$S_x[v_1 \vdots \ldots \vdots v_{p+1}] = [v_1 \vdots \ldots \vdots v_{p+1}] \quad \text{[Equation 7]}$$

$$\text{diag}\left[\lambda_1, \ldots, \lambda_M, \underbrace{0, \ldots, 0}_{\text{Number of } (p+1-M)}\right]$$

$$S_x V = V\Lambda.$$

Here, 'V' may denote an orthogonal matrix having a characteristic of $V^H V = VV^H = I$, and an eigenvalue '$\lambda_i$' may have a decreasing order. In this instance, 'H' may denote complex conjugate transpose operators.

$$\lambda_1 \geq \lambda_2 \ldots \geq \lambda_M \geq \lambda_{M+1} = \ldots = \lambda_{p+1} = 0. \quad \text{[Equation 8]}$$

Here, when post-multiplying $V^H$ in both sides of Equation 8, the following Equation 9 may be obtained.

$$S_x = V\Lambda V^H = \sum_{i=1}^{p+1} \lambda_i v_i v_i^H = \sum_{i=1}^{M} \lambda_i v_i v_i^H. \quad \text{[Equation 9]}$$

Here, since $S_\chi$ has a rank M, M-numbered greater eigenvalues of a matrix $\Lambda$ may be greater than zero, and $(p+1-M)$-numbered eigenvalues may have zero.

The noise autocorrelation matrix '$W_\chi$' may be expressed, using an orthogonal eigenvector, as the following Equation 10.

$$W_x = \sigma^2 I = \sigma^2 VV^H = \sum_{i=1}^{p+1} \sigma^2 v_i v_i^H. \quad \text{[Equation 10]}$$

From Equations 9 and 10, the autocorrelation matrix '$R_\chi$' may be expressed as the following Equation 11.

$$R_x = S_x + W_x = \sum_{i=1}^{M} (\lambda_i + \sigma^2) v_i v_i^H + \sum_{i=M+1}^{p+1} \sigma^2 v_i v_i^H. \quad \text{[Equation 11]}$$

When Equation 11 is re-expressed as a matrix, the following Equation 12 may be obtained.

$$R_x = V \begin{bmatrix} \lambda_1 + \sigma^2 & & & & & \\ & \ddots & & & 0 & \\ & & \lambda_M + \sigma^2 & & & \\ & & & \sigma^2 & & \\ & 0 & & & \ddots & \\ & & & & & \sigma^2 \end{bmatrix} V^H. \quad \text{[Equation 12]}$$

In Equation 12, in a case of an absence of noise, the matrix $\Lambda$ may have the rank M, and in a case of a presence of noise, the matrix $\Lambda$ may have a maximum rank. In a case of signals with noise, as for dispersion of eigenvalues of the autocorrelation matrix, the autocorrelation matrix may have M-numbered greater eigenvalues and $(p+1-M)$-numbered smaller eigenvalues.

As for signal elements measured in most problems, an implicative or accurate linear model may exist. In a determined signal model, an average of measured values may have a linear model, and in a random process, a covariance may have the linear model. Methods of extracting interference from measured signals may be based on a quadratic type or a linear transformation type of measured values.

In a principle of extracting noise and interference based on the above described linear model, SVD may serve as a significantly import part, and the reason for this may be briefly classified into three as follows.

First, in a case of signals with noise, and a signal matrix being comprised of a linear model, SVD may be an appropriate decomposition tool for approximating a measured matrix to a lower order matrix.

Second, SVD may be a useful tool for decomposing the measured matrix into a major subspace and a minor subspace. That is, when the measured matrix is assumed to a span of an arbitrary subspace, SVD may decompose the measured matrix into the major subspace and the minor subspace being orthogonal to each other (e.g., signal sub-space, noise subspace). Third, SVD of a model matrix may decompose a pseudo-inverse matrix in an orthogonal manner to thereby obtain projection operators from the model matrix.

A process in which the system 100 performs SVD using an autocorrelation matrix in operation 330 will be herein described in detail.

A principle and characteristics required for calculating SVD that may provide characteristics of an arbitrary matrix in association with the above described eigenvalue based on the above described importance of the SVD will be herein described in detail.

When A substitutes for (m×n)-th order complex matrices, there may exist (m×m)-th order unitary matrices U and (n×n)-th order unitary matrices V, which satisfy the following Equation 13.

$$A = U\Sigma V^H,$$ [Equation 13]

where Σ denotes (m×n)-th order diagonal matrices, which is zero or a positive number.

$$\sigma_1 \geq \sigma_2 \geq \ldots \geq \sigma_h \geq 0, \; h = \min(m,n),$$ [Equation 14]

where a diagonal component $\sigma_k$ may be referred to as a singular value of a matrix A, and $\sigma_k$ may be the same as a square root of eigenvalues of $A^H A$ and $AA^H$.

A process in which the system 100 computes a parameter v(k) using the singular value $\sigma_k$ in operation 340 will be herein described in detail.

As described above, SVD may be frequently used as a useful tool for approximating a rank of a matrix. A principle of approximating the rank of the matrix will be herein described in detail.

A matrix $A^{(k)}$ which most excellently approximates to a matrix A in a view of Frobenius norm may be shown as $$A^{(k)} = U\Sigma_k V^H,$$ [Equation 15]

wherein U and V may be shown as Equation 13, and $\Sigma_k$ may be a matrix in which from $\sigma_{k+1}$ to $\sigma_h$ are set as zero.

$$\|A - A^{(k)}\|_F = \left[\sum_{i=k+1}^{h} \sigma_i^2\right]^{\frac{1}{2}}, \; 0 \leq k \leq h.$$ [Equation 16]

In Equation 16, a degree in which the matrix $A^{(k)}$ approximates to the matrix A may rely on (h-k)-numbered singular values. As 'k' approaches 'h', a difference between $A^{(k)}$ and A may be reduced, and when 'k'='h', Equation 16 may be zero.

An appropriate parameter for approximating a rank of a matrix to prevent an error $\|A-A^{(k)}\|_F$ from relying on a size of the matrix A may be normalized as a sum of all singular values as shown in Equation 17.

Accordingly, the parameter v(k) may be suggested based on the above described principle of approximating the rank of the matrix.

$$v(k) = \frac{\|A^{(k)}\|_F}{\|A\|_F} = \left[\frac{\sum_{i=1}^{k} \sigma_i^2}{\sum_{i=1}^{h} \sigma_i^2}\right]^{\frac{1}{2}}.$$ [Equation 17]

Obviously, as 'k' approaches 'h', the normalized ratio may approach '1'. From Equation 17, when a rank of the matrix A is significantly smaller than 'h', a speed in which the parameter v(k) approaches '1' may increase, when the rank of the matrix A approximates to 'h', the speed may decrease.

According to an exemplary embodiment, the above described characteristics may be used as a method for determining whether signals are present in a particular band. In this instance, subjective determination errors occurring in an existing method may be reduced when an appropriate value (e.g., 0.95) suitable for a condition is designated, and a practically designated value is determined based on a predetermined reference value.

Figure 4:
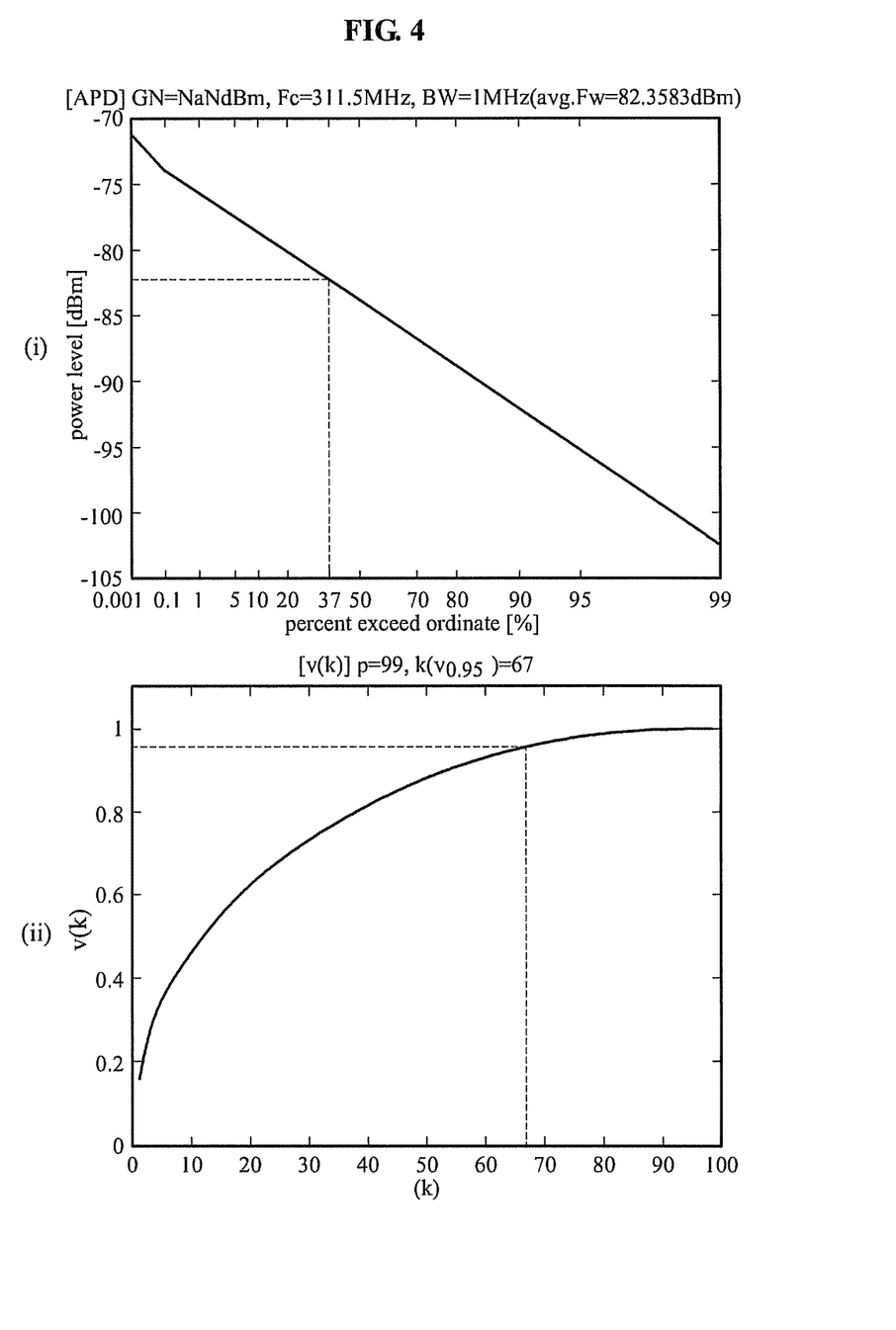
FIGS. 4 to 6 are diagrams illustrating examples where exemplary embodiments are adopted, as actual measurement data samples.
Figure 5:
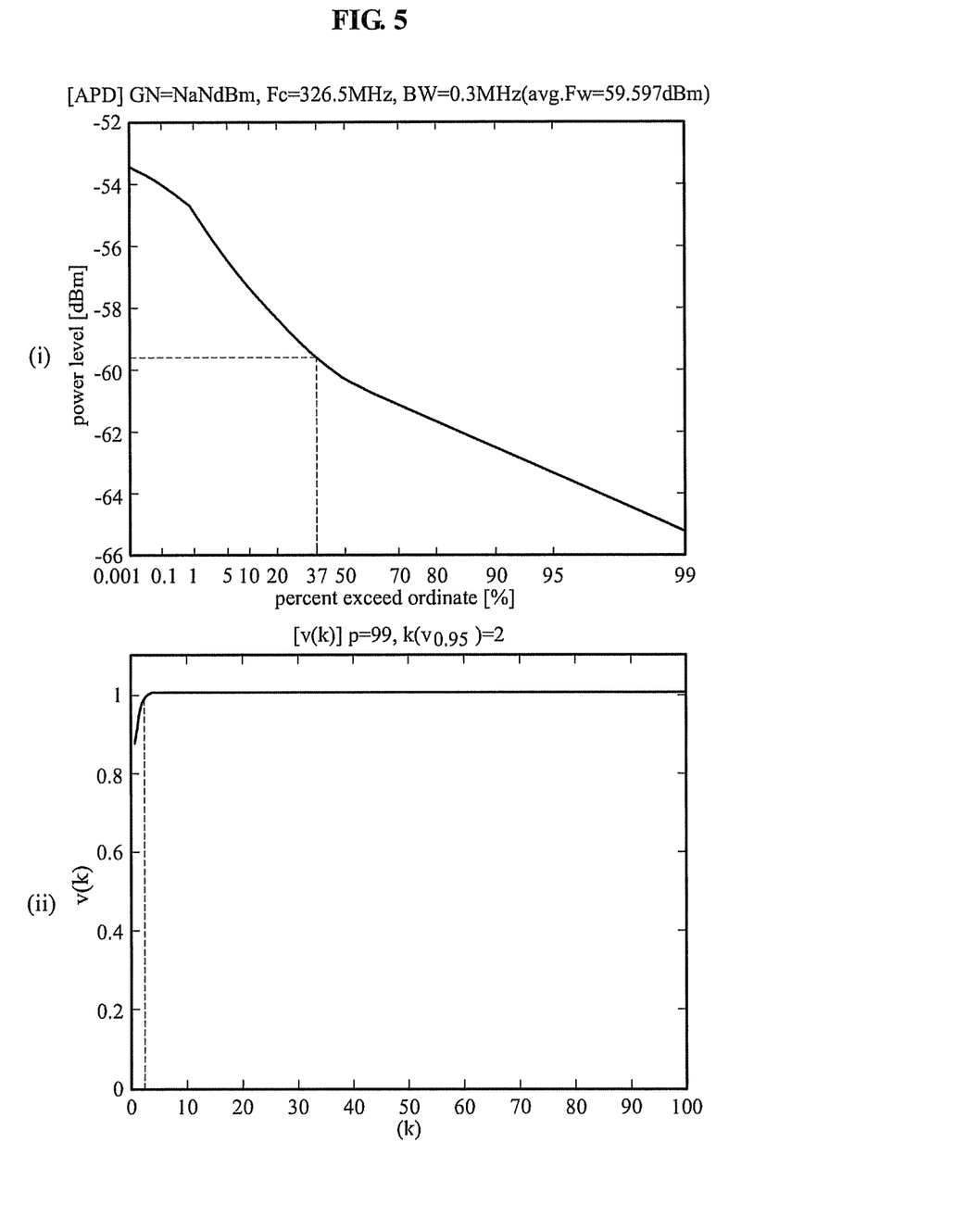
Figure 6:
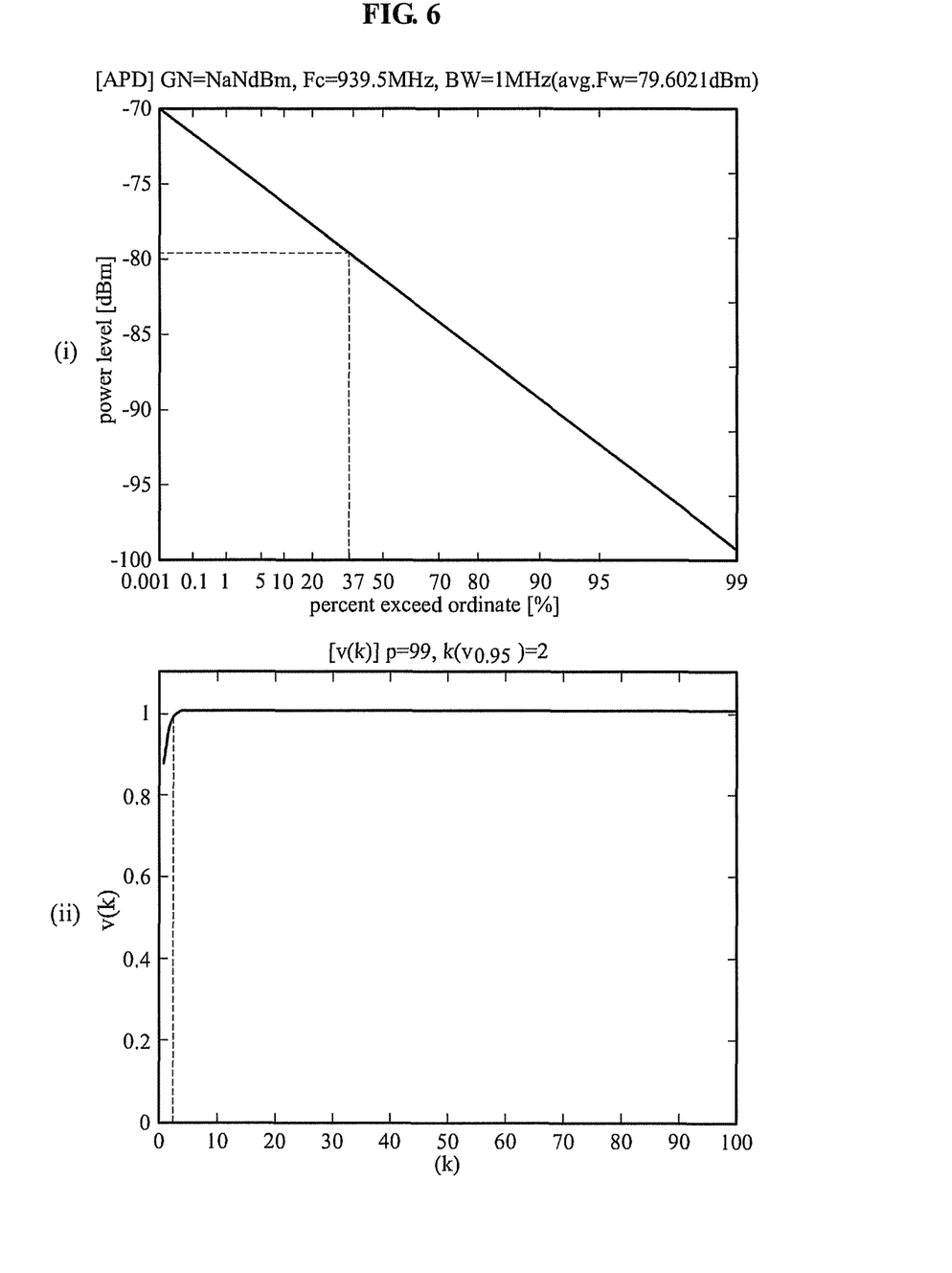

FIGS. 4 to 6 are diagrams illustrating examples where exemplary embodiments are adopted, as actual measurement data samples.

Referring to FIG. 4, according to an exemplary embodiment, signal data obtained using a filter having a center frequency of 311.5 MHz and an intermediate frequency (IF) bandwidth of 1 MHz, and a parameter having a 1.25 MHz sampling rate may be used with respect to a sub-band estimated not to have a great power when using a spectrum analyzer, that is, a sub-band estimated to be comprised of only noise.

Also, 100,000 sample data may be used in a signal intensity probability distribution graph, and a number of samples used to obtain an autocorrelation coefficient may be 5,000.

Also, from the signal intensity probability distribution graph illustrated in (i) of FIG. 4, it can be found that Gaussian characteristics may be significantly shown due to a linear pattern.

Also, as for a result obtained by calculating an autocorrelation matrix having p=99 as shown in a graph illustrated in (ii) of FIG. 4, since 'k' satisfying 'v(k)=0.95' is 67, it can be found that a corresponding sub-band may be comprised of only noise due to 'k' being greater than (p+1)/2=50.

In FIG. 5, a result analyzing data obtained using a 375 kHz sampling rate in such a manner that a sub-band where signals are present is selected and signals having a center frequency of 326.6 MHz is received using a filter having an IF bandwidth of 300 kHz is illustrated.

From a amplitude probability distribution (APD) illustrated in (i) of FIG. 5, it can be easily found that signals other than noise are present due to a convex-like shape of a front part of the graph.

Also, from a v(k) graph illustrated in (ii) of FIG. 5, since a value of v(k) is greater than 0.95 at k=2, it can be found that signals are present.

In FIG. 6, a signal intensity probability graph and a v(k) graph showing a pattern that is insignificantly distinguished from a linear pattern even though signals are present are illustrated.

In FIG. 6, when the signals are present, whether the signals are present or absent is not determined in the signal intensity probability distribution graph, however, whether the signals are present or absent is effectively determined in the v(k) graph according to an exemplary embodiment.

From the signal intensity probability distribution graph illustrated in (i) of FIG. 6, it may be difficult to distinguish a pattern of the graph from a linear pattern in a frequency band including signals other than background radio noise. However, from the graph v(k) illustrated in (ii) of FIG. 6, since a value of k satisfying v(k)=0.95 is '1', presence/absence of the signals may be definitely determined. Here, a number of samples used to obtain an autocorrelation function may be 5,000, and a signal intensity probability distribution may be obtained using 100,000 numbered samples in total.

The above described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A method comprising:
   selecting a first frequency band;
   verifying, by a computer, whether or not the selected first frequency band is signal-free;
   determining the first frequency band as a target measurement frequency when the verifying verifies that the selected first frequency band is signal-free; and
   measuring a background radio noise in the determined target measurement frequency, wherein the verifying includes:
   acquiring time domain data in association with the first frequency band,
   configuring an autocorrelation matrix using the acquired time domain data,
   calculating a singular value $\sigma_k$ through singular value decomposition (SVD) using the autocorrelation matrix,
   computing a parameter v(k) using the singular value $\sigma_k$, and
   verifying whether or not the first frequency band is signal-free based on the parameter v(k), and
   the parameter v(k) is computed by an Equation:

$$v(k) = \frac{\|A^{(k)}\|_F}{\|A\|_F} = \left[\frac{\sum_{i=1}^{k} \sigma_i^2}{\sum_{i=1}^{h} \sigma_i^2}\right]^{\frac{1}{2}}$$

where A is a data matrix consisting of time-domain data, $\|A\|_F$ is a Frobenius-norm of matrix A, $\|A^{(k)}\|_F$ is a Frobenius-norm of matrix A(k) that is approximated using a singular value from a first to a kth, k is an index of the singular value and h is a maximum value of rank.

2. The method of claim 1, wherein, when the verifying verifies that the selected first frequency band is not signal-free, the method further comprising:
   selecting a second frequency band being different from the first frequency band;
   verifying, by the computer, whether or not the selected second frequency band is signal-free; and
   determining the second frequency band as the target measurement frequency when it is verified that the second frequency band is signal-free.

3. The method of claim 1, wherein the verifying includes verifying, by the computer, whether or not the selected first frequency band is signal-free, by applying singular value decomposition (SVD).

4. The method of claim 1, wherein the selecting includes:
   measuring, using a spectrum analyzer, a spectrum data value with respect to a signal within each frequency band of a plurality of frequency bands; and
   selecting, as the first frequency band, a frequency band of the plurality of frequency bands having a minimum spectrum data value measured by the measuring.

5. The method of claim 1, wherein, when the verifying verifies that the selected first frequency band is not signal-free, the method further comprises:
   measuring, using a spectrum analyzer, a spectrum data value with respect to a signal within each of remaining frequency bands excluding the first frequency band of a plurality of frequency bands;
   selecting, as a second frequency band to replace the first frequency band, a frequency band of the remaining frequency bands having a minimum measured spectrum data value;
   verifying whether or not the selected second frequency band is signal-free; and
   determining the second frequency band as the target measurement frequency when it is verified that the second frequency band is signal-free.

6. A system comprising:
   a frequency selection unit to select a first frequency band;
   a signal verification unit to verify whether or not the selected first frequency band is signal-free;
   a target frequency determination unit to determine the first frequency band as a target measurement frequency when the signal verification unit verifies that the selected first frequency band is signal-free; and
   a noise measurement unit to measure a background radio noise in the determined target measurement frequency,
   wherein the signal verification unit verifies whether or not the selected first frequency band is signal-free by:
   acquiring time domain data in association with the first frequency band,
   configuring an autocorrelation matrix using the acquired time domain data,
   calculating a singular value $\sigma_k$ through singular value decomposition (SVD) using the autocorrelation matrix,
   computing a parameter v(k) using the singular value $\sigma_k$, and verifying whether or not the first frequency band is signal-free based on the parameter v(k), and
the parameter v(k) is computed by an Equation:

$$v(k) = \frac{\|A^{(k)}\|_F}{\|A\|_F} = \left[\frac{\sum_{i=1}^{k} \sigma_i^2}{\sum_{i=1}^{h} \sigma_i^2}\right]^{\frac{1}{2}}$$

where A is a data matrix consisting of time-domain data, $\|A\|_F$ is a Frobenius-norm of matrix A, $\|A^{(k)}\|_F$ is a Frobenius-norm of matrix A(k) that is approximated using a singular value from a first to a kth, k is an index of the singular value and h is a maximum value of rank.

7. The system of claim 6, wherein, when the signal verification unit verifies that the selected first frequency band is not signal-free,
the frequency selection unit selects a second frequency band being different from the first frequency band,
the signal verification unit verifies whether or not the selected second frequency band is signal-free, and
the target frequency determination unit determines the second frequency band as the target measurement frequency when the signal verification unit verifies that the selected second frequency band is signal-free.

8. The system of claim 6, wherein the frequency selection unit measures, using a spectrum analyzer, a spectrum data value with respect to a signal within each frequency band of a plurality of frequency bands, and selects, as the first frequency band, a frequency band of the plurality of frequency bands having a minimum spectrum data value measured by the frequency selection unit.

9. The system of claim 6, wherein, when the signal verification unit verifies that the selected first frequency band is not signal-free,
the frequency selection unit measures, using a spectrum analyzer, a spectrum data value with respect to a signal within each of remaining frequency bands excluding the first frequency band of a plurality of frequency bands, and selects, as a second frequency band to replace the first frequency band, a frequency band of the remaining frequency bands having a minimum spectrum data value measured by the frequency selection unit,
the signal verification unit verifies whether or not the selected second frequency band is signal-free, and
the target frequency determination unit determines the second frequency band as the target measurement frequency when the signal verification unit verifies that the selected second frequency band is signal-free.

* * * * *